United States Patent [19]

Uffner

[11] 4,347,171

[45] Aug. 31, 1982

[54] CHEMICALLY MODIFIED ASPHALT JOINT SEALING COMPOSITIONS

[75] Inventor: William E. Uffner, Newark, Ohio

[73] Assignee: Owens-Corning Fiberglas Corporation, Toledo, Ohio

[21] Appl. No.: 247,565

[22] Filed: Mar. 25, 1981

[51] Int. Cl.$^3$ ............................................. C08L 95/00
[52] U.S. Cl. ........................................ 524/71; 524/534
[58] Field of Search .................. 260/28.5 AS, 28.5 R; 106/278

[56] References Cited

U.S. PATENT DOCUMENTS 3,440,195  4/1969  Norcross ............................ 260/28.5
4,175,978  11/1979  Marzocchi et al. ............. 106/281 R
4,273,685  6/1981  Marzocchi et al. ......... 260/28.5 AS Primary Examiner—Theodore E. Pertilla
Attorney, Agent, or Firm—Ronald C. Hudgens; Robert F. Rywalski

[57] ABSTRACT

Sealant compositions, particularly for use in joints between adjacent concrete slabs and deck membranes are provided. The sealant compositions comprise the reaction product of a mixture consisting essentially of asphalt flux, styrene monomer and a vulcanizable rubber.

1 Claim, No Drawings

CHEMICALLY MODIFIED ASPHALT JOINT SEALING COMPOSITIONS

TECHNICAL FIELD

This invention relates to asphaltic compositions and, more particularly, it relates to chemically modified asphalt compositions. Even yet more particularly, the present invention relates to chemically modified asphalt compositions having utility as a joint sealant.

BACKGROUND AND SUMMARY

Joint sealants of the hot poured type have been used for many years in sealing joints and cracks in Portland cement concrete and asphaltic concrete pavements. Such pavements typically are those existing on the highway, but they may likewise include airfield pavements, parking lot pavements, and bridge decks.

These joint sealing compositions are typically composed of a mixture of materials which will form a resilient and adhesive compound capable of effectively sealing joints in the concrete against infiltration of moisture and foreign material throughout repeated cycles of expansion and contraction with temperature changes and that will not flow from the joint or be picked up by vehicle tires at summer temperatures. The materials are formulated so that they are capable of being brought to a uniform pouring consistency suitable for completely filling the joints without inclusion of large air holes or discontinuities and without damage to the material.

Two specifications have been established for such a concrete joint sealing composition. One is set forth as ASTM D 3405-75-T, which is hereby incorporated by reference. One of the significant tests in ASTM D 3405-75-T is a resilience test in which the recovery shall be a minimum of 60%. The standard specification adopted by the federal government for a concrete joint sealing composition is Federal Specification SS-S-164, which is the same as ASTM designation D 1190-74, both of which are likewise hereby incorporated by reference. The latter specification has a significant test, termed the bond test, in which the sealer is tested at 0° F. (−17.8° C.) for five complete cycles. The development at any time during the test procedure of a crack, separation or other opening that at any point is over 1-¼" (6.4 mm) deep in the sealer or between the sealer and mortar block shall constitute failure of the test specimen. Additionally, Federal Specification SS-S-164 requires the joint sealer to have a pour point which is at least 20° F. (11° C.) lower than the safe heating temperature, which is the maximum temperature to which the material may be heated without exceeding the permitted flow. The test also requires a penetration at 77° F. (25° C.), 150 g, 5s of 90 or less, and a flow at 140° F. (60° C.) which does not exceed 5 mm.

The present invention provides for an improved joint sealing compositon which has good cold temperature flex, a good elastic recovery, is non-tacky, non-bleeding, and which has a wide temperature range for use with good adhesion to concrete, be it Portland cement type concrete or asphaltic cement. Such composition reliably passes the resiliency test of ASTM D 3405-75-T and the standard Federal Specification SS-S-164 for concrete joint sealers of the hot poured elastic type.

The joint sealer of the present invention comprises the reaction product of a mixture of prescribed amounts of asphalt flux, styrene, and a rubber polymer.

DESCRIPTION

Thus, in accordance with the present invention a highway joint sealing composition is provided which comprises the reaction product of a mixture consisting essentially of asphalt flux, styrene monomer and a vulcanizable rubber selected from the group consisting of butadiene and a styrene-butadiene rubber or mixtures thereof; the mixture, based on the weight of flux, styrene and rubber will be about 69 to about 74% of the flux, and on a theoretical basis about 14.5 to about 18% of styrene moiety and about 10.5 to about 14.5% of butadiene moiety with the weight ratio of styrene monomer to the flux being at least about 0.1%.

In a highly preferred embodiment of the invention, a composition will be provided for use as a highway joint sealing material by employing a vulcanizable styrene-butadiene rubber which is a copolymer of about 25% by weight styrene and about 75% by weight butadiene. One such suitable copolymer is available commercially under the trade designation Solprene 1205C from Phillips Petroleum. When using such a rubber the mixture which is employed to produce the reaction product will consist essentially of about 69% to about 74% asphalt flux, about 10.5 to about 13% styrene and about 14.5% to about 18.5% of the rubber (based on the weight of flux, styrene and rubber). Preferably, the flux will be present in the mixture in an amount of about 69.4 to about 73.8%, styrene about 10.9 to about 12.6% and the Solprene 1205C rubber in an amount of about 14.8 to about 18.3%.

Representative preferred compositions are set forth in Table I wherein the recovery refers to the resiliency test of ASTM D 3405-75-T and the cycles refers to the bond test as set forth in Federal Specification SS-S-164 (ASTM D 1190-74).

TABLE I

| | (% by weight) | | | | | | |
|---|---|---|---|---|---|---|---|
| | 1 | 2 | 3 | 4 | 5 | 6 | Reference |
| Asphalt Flux (Kopper's) | 72.1 | 71.4 | 73.8 | 70.8 | 69.4 | 72.6 | 77.5 |
| Styrene | 11.2 | 11.9 | 11.4 | 10.9 | 12.6 | 12 | 10 |
| Solprene 1205C Rubber | 16.7 | 16.8 | 14.8 | 18.3 | 18 | 15.4 | 12.5 |
| Recovery | 62% | 60% | 64% | 60% | 69% | 60% | 42-45% |
| Cycles | >5 | >5 | >5 | >5 | >5 | >5 | 1-3 |

TABLE II

| | (% weight) | | | | | | |
|---|---|---|---|---|---|---|---|
| | 1 | 2 | 3 | 4 | 5 | 6 | Reference |
| Asphalt Flux | 72.1 | 71.4 | 73.8 | 70.8 | 69.4 | 72.6 | 77.5 |
| Styrene Moiety (Theoretical) | 15.4 | 16.1 | 15.1 | 15.5 | 17.1 | 15.8 | 13.1 |
| Butadiene Moiety (Theoretical) | 12.5 | 12.6 | 11.1 | 13.7 | 13.5 | 11.6 | 9.4 |

Referring to Table I, it will be noticed that the recovery is in excess of 60% for compositions 1-6 and likewise these compositions withstand at least five cycles. In contrast, it will be noted that the reference composition is not satisfactory. Table II below sets forth the same joint sealing compositions as those in Table I, but sets them forth in terms of asphalt flux, styrene moiety and butadiene moiety. As will be apparent, the latter two moieties are based on theoretical considerations, and these moieties are simply obtained by determining the theoretical amount of butadiene and styrene moieties introduced into the reaction mixture, whether in the form of a partially polymerized material as in the case of butadiene rubber, or in the flow of a monomeric material as in the case of styrene, in combination with a polymerized form thereof, namely in the form of a styrene-butadiene copolymer.

More specifically, it will be readily apparent that the present joint sealing composition will, in effect, contain in its final form a reaction product which will include an asphalt flux moiety, a styrene moiety, and a butadiene moiety. Some of the styrene must be employed in the form of styrene monomer, but some of the styrene can be introduced in the form of a vulcanizable styrene-butadiene copolymer. Optionally, all of the styrene can be employed as a monomer and all of the butadiene moiety being introduced in the form of a vulcanizable butadiene homopolymer. Tables I and II above illustrate the preferred embodiment wherein a portion of the styrene moiety is introduced in the form of styrene monomer with another portion being introduced in the form of the copolymer, namely Solprene 1205C rubber. Thus, for example, the total styrene moiety in Example 1 represents the monomeric styrene, 11.2, plus the styrene portion of the Solprene 1205C monomer, i.e., 25% times 16.7%. Similarly in Example 1, the butadiene moiety represents the portion of butadiene employed in making the Solprene 1205C copolymer, namely 75% times 16.7%.

In order to synthesize the superior joint sealing compositions of the present invention, all that is required is to admix the asphalt flux, styrene, and the rubber and then heat that reaction mixture at a temperature and for a time sufficient to substantially complete the reaction. Preferably, this will be done at a temperature of at least about 170° C. for a period of at least about 24 hours.

Asphalt flux that is employed in the present invention is well known to those skilled in the art and represents the petroleum residue after distillation; this residue is not air blown. The butadiene homopolymer, or copolymer of styrene and butadiene, may be selected from a wide variety of commercially available materials. As previously indicated, one such preferred type material is the rubber sold by Phillips Petroleum under their designation Solprene 1205C. Such a material typically will have a molecular weight in the range of about 80,000 to about 125,000 (weight average molecular weight).

It will, of course, be apparent that, if desired, suitable fillers and adjuvants may be incorporated into the joint sealing composition. For example, glass fibers, glass flake, limestone and aggregate may be employed. Usually, however, the joint sealing composition will be employed as a hot pour type without such materials.

It will, of course, be apparent that modifications are possible which pursuant to the Patent Statutes and Laws do not depart from the spirit and scope thereof.

I claim:

1. A composition for use as a highway joint sealing material, said composition having a recovery of at least 60% for the resilience test of ASTM D 3405-75-T and having at least five cycles for the bond test of Federal Specification SS-S-164, said composition comprising the reaction product of a mixture consisting essentially of asphalt flux, styrene and a vulcanizable styrene-butadiene rubber, said rubber being a copolymer of about 25% by weight styrene and about 75% by weight butadiene, and said mixture being about 69.4% to about 73.8% asphalt flux, about 10.9% to about 12.6% styrene and about 14.8% to about 18.3% of said rubber, based on the weight of flux, styrene and said rubber.

* * * * *